US008599441B2

(12) United States Patent
Shibayama

(10) Patent No.: US 8,599,441 B2
(45) Date of Patent: Dec. 3, 2013

(54) FAX MACHINE

(75) Inventor: Yuki Shibayama, Yamato-Koriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1575 days.

(21) Appl. No.: 12/136,855

(22) Filed: Jun. 11, 2008

(65) Prior Publication Data

US 2008/0309985 A1   Dec. 18, 2008

(30) Foreign Application Priority Data

Jun. 15, 2007 (JP) ................................ 2007-158927

(51) Int. Cl.
*H04N 1/00* (2006.01)

(52) U.S. Cl.
USPC ......... 358/400; 358/1.13; 358/1.15; 358/401; 358/442; 358/444

(58) Field of Classification Search
USPC ............ 358/1.15, 404, 1.13, 1.14, 1.16, 400, 358/401, 402, 405, 413, 440, 442, 443, 444, 358/448, 468; 399/7, 79, 80, 82, 83, 85
See application file for complete search history.

(56) References Cited

U.S. PATENT DOCUMENTS

| 4,823,376 | A | | 4/1989 | Takashashi | |
|---|---|---|---|---|---|
| 5,371,572 | A | * | 12/1994 | Sauer | 399/7 |
| 6,115,141 | A | * | 9/2000 | Kim | 358/404 |
| 6,636,327 | B2 | * | 10/2003 | Yoshida et al. | 358/1.15 |
| 7,492,472 | B2 | * | 2/2009 | Penke et al. | 358/1.15 |
| 7,561,296 | B2 | * | 7/2009 | Fujinaga | 358/1.18 |
| 2005/0185217 | A1 | | 8/2005 | Nishizawa et al. | |
| 2006/0290973 | A1 | * | 12/2006 | Inouye et al. | 358/1.15 |
| 2007/0127059 | A1 | * | 6/2007 | Honda et al. | 358/1.15 |

FOREIGN PATENT DOCUMENTS

| JP | 60-142356 A | 7/1985 |
|---|---|---|
| JP | 62-015967 | 1/1987 |
| JP | 62-213454 A | 9/1987 |
| JP | 63-098280 | 4/1988 |
| JP | 64-046360 A | 2/1989 |
| JP | 02-025153 | 1/1990 |
| JP | 05-014677 | 1/1993 |
| JP | 2000-224288 | 8/2000 |
| JP | 2003-229978 A | 8/2003 |
| JP | 2005-244488 A | 9/2005 |
| JP | 2006-191182 A | 7/2006 |
| JP | 2006-352614 A | 12/2006 |
| JP | 2007-006400 A | 1/2007 |

* cited by examiner

*Primary Examiner* — Vu B Hang
(74) *Attorney, Agent, or Firm* — Renner, Otto, Boisselle & Sklar, LLP

(57) ABSTRACT

A fax machine includes a setting recorder, a communication device, a remainder calculator, a determination device, and a controller. The setting recorder holds setting information on a fax transmission job. The communication device performs the transmission job based on the held setting information. The remainder calculator calculates the number of sheets which can be faxed further for the transmission job by the fax machine. When the transmission job stops, the determination device determines, based on the calculated number of sheets, whether the job is completed. If the determination device determines, when the transmission job stops, that the transmission job is completed, the controller clears the setting recorder. If the determination device determines, when the transmission job stops, that the transmission job is not completed, the controller does not clear the setting recorder.

9 Claims, 6 Drawing Sheets

FIG.5

| NUMBER OF SHEETS WHICH CAN BE FAXED FURTHER | STAND-BY TIME (MINUTES) |
|---|---|
| 1 - 5 | 3 |
| 6 - 10 | 5 |
| 11 - 20 | 10 |
| 21 - 49 | 15 |
| 50 OR MORE CREDIT CARD | 30 |

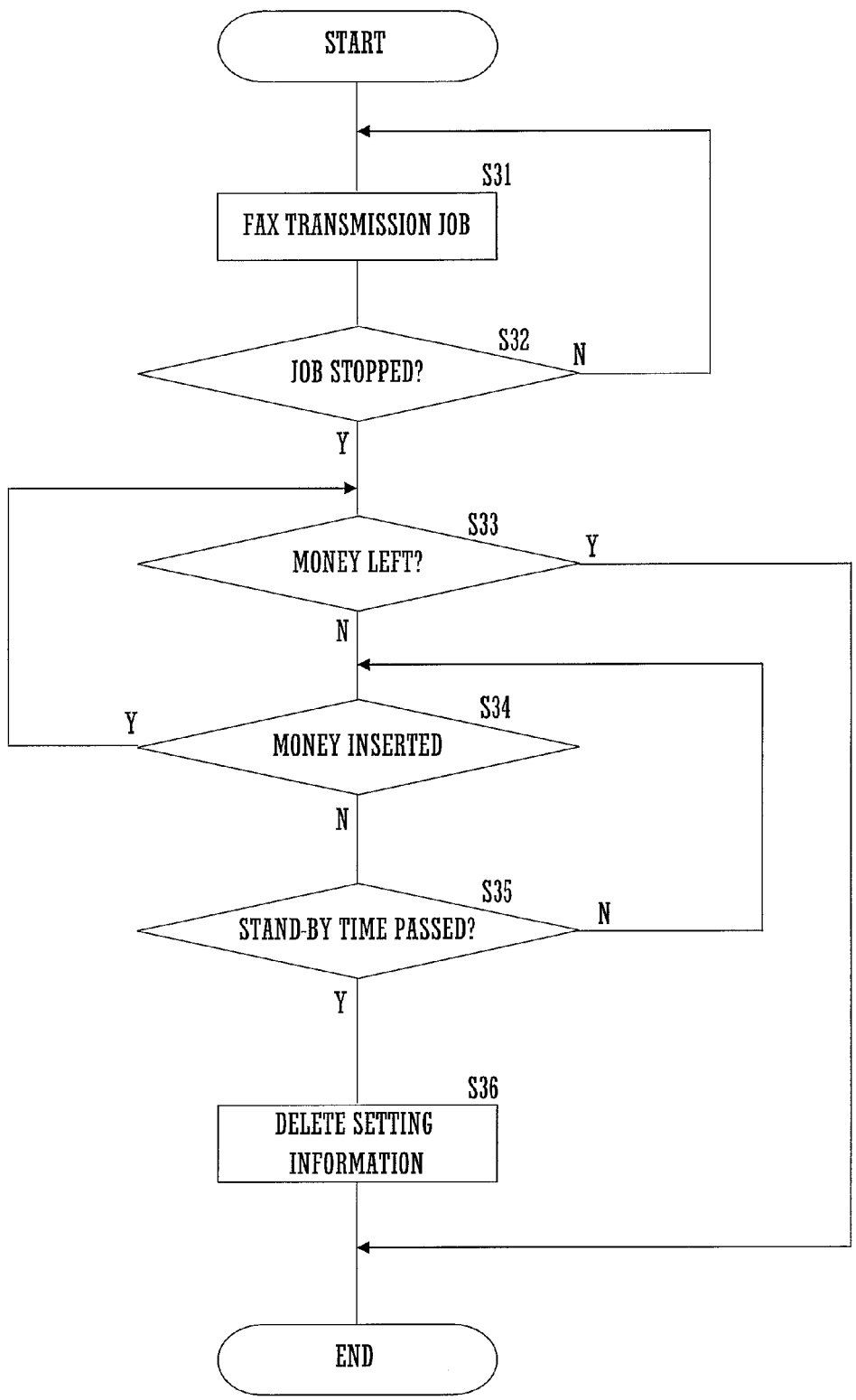

FAX MACHINE

CROSS REFERENCE

This Nonprovisional application claims priority under 35 U.S.C. §119(a) on Patent Application No. 2007-158927 filed in Japan on Jun. 15, 2007, the entire contents of which are hereby incorporated by reference.

BACKGROUND OF THE INVENTION

The present invention relates to a fax machine having an accounting function.

In recent years, faxing services are as easily available as public telephones. For example, faxing services have recently been available at many convenience stores.

If one uses a faxing service at a convenience store, the store has to collect the money for the service. A coin vendor may be used to collect money effectively. JP H2-25153 A discloses a conventional fax machine fitted with a coin vendor, which subtracts the charge for a faxing service from the amount of money inserted into the vendor, and which keeps fax transmission possible until the remainder of the inserted amount becomes insufficient.

When one uses a fax machine for public use, it is important for him/her to avoid the risk of information leakage. For example, if the fax machine holds the destination number, the number may become known to third parties.

It may be inconvenient to delete the destination number from a fax machine every time a fax transmission job is interrupted. Some convenience stores limit the number of sheets which can be faxed at a time. When one uses a faxing service at a convenience store, it is troublesome for him/her to reenter the destination number, image quality, and other setting information every time a fax transmission job is interrupted.

The object of the present invention is to provide a convenient fax machine which avoids the risk of information leakage.

SUMMARY OF THE INVENTION

A fax machine according to the present invention has an accounting function and includes a setting recorder, a job processor, a money inlet, a remainder calculator, a determination device, and a recording controller.

The setting recorder holds setting information on a fax transmission job which a user requests the fax machine to perform. The setting information may be the destination number, image quality, and/or image size.

The job processor performs the transmission job based on the held setting information.

The user inserts an amount of money into the money inlet.

The remainder calculator calculates a remainder by subtracting, from the inserted amount of money, the charge of the fax machine for the sheets faxed already for the transmission job. Based on the remainder of the inserted amount and the charge of the fax machine for one sheet, the remainder calculator calculates the number of sheets which can be faxed further for the job by the fax machine.

In general, the number of sheets which can be faxed further for a transmission job by the fax machine is the integral part of the quotient found by dividing, by the charge for one sheet, the remainder of the amount of money inserted into the money inlet by a user.

When a fax transmission job stops, the determination device determines, based on the number of sheets calculated for the job by the remainder calculator, whether the job is completed.

As an example of the determination, if the calculated number of sheets is zero when the transmission job stops, the determination device may determine that the job is completed. Likewise, if the calculated number is not zero when the transmission job stops, the determination device may determine that the job is not completed.

By detecting with a sensor whether the user is present near the fax machine, the determination device may also determine whether the transmission job is completed.

Even if the calculated number of sheets is not zero, the determination device may, if a specified stand-by time has passed after the transmission job stops, determine that the job is completed. This makes it possible to determine, even if the user has forgotten to take out the remainder of the inserted amount of money, whether the transmission job is completed. The stand-by time may be directly proportional to the remainder of the inserted amount. It is conceivable that the user will be less liable to forget to take out a larger remainder of the inserted amount.

If a credit card is inserted into the fax machine, the determination device may, as far as a considerable time has not passed, also determine that the transmission job is not completed.

When the transmission job stops, the recording controller clears the setting recorder if the determination device determines that the job is completed. Accordingly, if the transmission job is completed, the setting recorder is cleared. This makes the destination number and other personal information less liable to leak out to third parties.

When the transmission job stops, the recording controller does not clear the setting recorder if the determination device determines that the job is not completed. Accordingly, if the transmission job is not completed, the user does not need to reenter the setting information on the job when the job stops. This makes it easy for the user to redial.

BRIEF DESCRIPTION OF THE DRAWINGS

FIG. 5 is a table of the relation between the number of sheets which can be faxed further by the fax machine and stand-by time.

FIG. 6 is a flowchart of another procedure according to which the controller can operate.

DETAILED DESCRIPTION OF THE INVENTION

Figure 1:
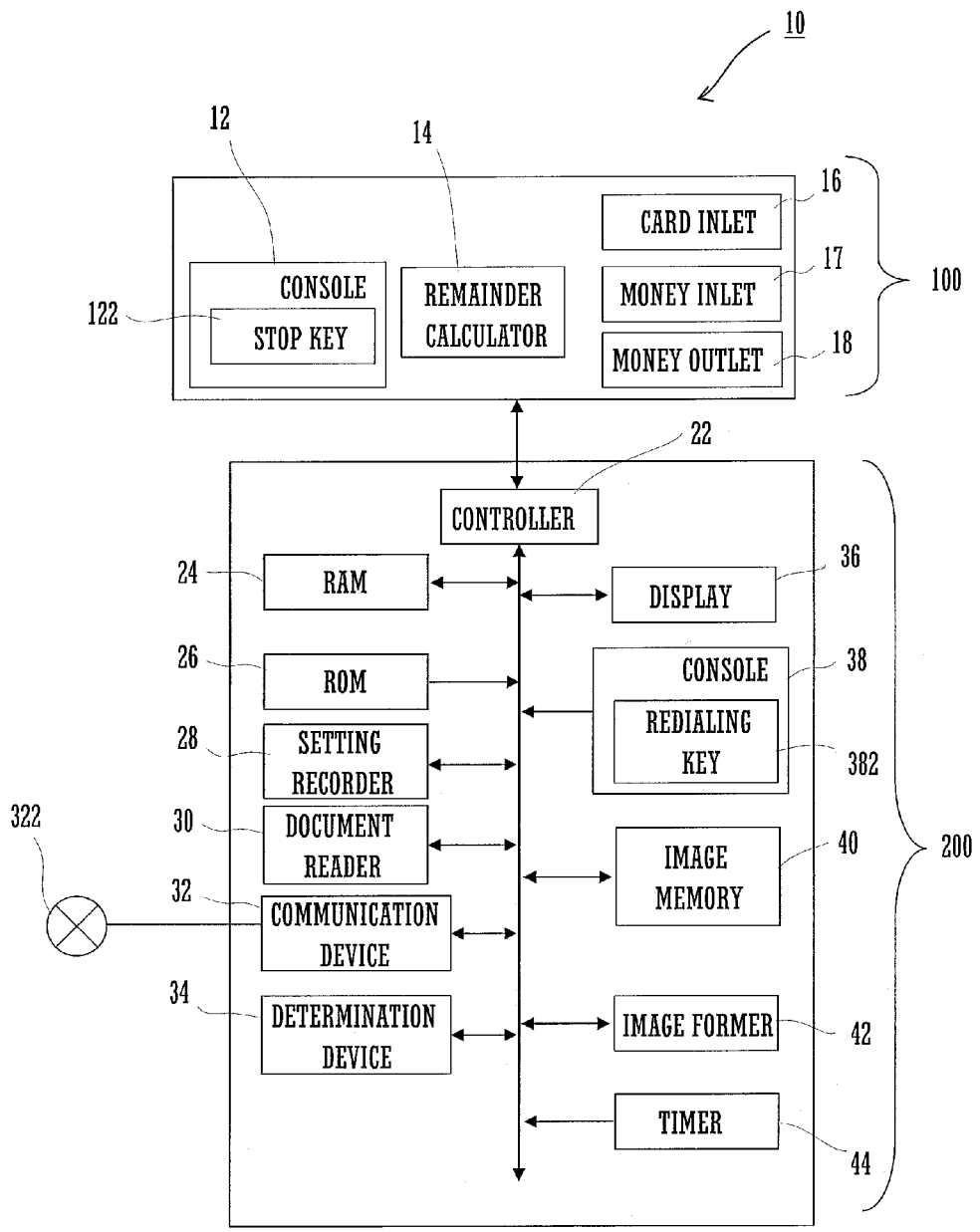
FIG. 1 is a block diagram of a fax machine embodying the present invention.

FIG. 1 shows a fax machine 10 embodying the present invention. The machine 10 is designed for public use and may be installed at a convenience store. The machine 10 includes an accounting unit 100 and a main unit 200.

The accounting unit 100 has an accounting function and includes a card inlet 16, a money inlet 17, a money outlet 18, a remainder calculator 14, and a console 12.

The card inlet 16 is so designed that a credit card can be inserted into it. The card inlet 16 might be so designed that a prepaid card or another card for the accounting for the use of the machine 10 could be inserted into this inlet.

The money inlet 17 is so designed that coins and paper money can be inserted into it for the use of the machine 10. The money outlet 18 is so designed that coins and paper money can be returned from it to users.

The remainder calculator 14 subtracts, from the amount of money inserted into the money inlet 17 for a fax transmission job, the charge of the machine 10 for the sheets faxed already for the job. Based on the remainder of the inserted amount and the charge of the machine 10 for one sheet, the remainder calculator 14 calculates the number of sheets which can be faxed further for a fax transmission job by the machine.

The console 12 includes keys (not shown) which a user presses to make an entry in the accounting unit 100. The console 12 further includes a stop key 122, which a user presses to stop using the machine 10.

The main unit 200 includes a setting recorder 28, a document reader 30, a communication device 32, and a determination device 34.

The setting recorder 28 holds the setting information recorded in it on the fax transmission job which the machine 10 is requested to perform. The setting information includes the destination number, image quality, color/monochrome selection, and image size.

The document reader 30 reads the image on a document which the machine 10 is requested to copy or fax.

The communication device 32 performs a transmission job based on the setting information recorded on the job in the setting recorder 28.

When a fax transmission job stops, the determination device 34 determines, based on the number of sheets which can be faxed further for the job, whether the job is completed. Specifically, if the number of sheets calculated by the remainder calculator 14 is zero when the transmission job stops, the determination device 34 determines that the job is completed.

The main unit 200 further includes a RAM 24, a ROM 26, and a controller 22.

The RAM 24 is a volatile memory, which stores data temporarily. The ROM 26 stores the programs necessary for the operation of the controller 22.

When a fax transmission job stops, the controller 22 clears the setting recorder 28 if the determination device 34 determines that the job is completed. Even when a fax transmission job stops, the controller 22 does not clear the setting recorder 28 if the determination device 34 determines that the job is not completed.

The main unit 200 further includes a liquid crystal display 36, a console 38, an image memory 40, an image former 42, and a timer 44.

The display 36 displays the information which needs to be given to a user.

The console 38 includes keys (not shown) which a user presses to enter data such as setting information on a fax transmission job in the controller 22. The console 38 further includes a redialing key 382, which a user presses to enter a redialing command in the controller 22. If the redialing key 382 is pressed when a fax transmission job stops, the communication device 32 performs the job based on the associated setting information recorded in the setting recorder 28.

The image memory 40 stores the image data which the machine 10 is requested to copy or transmit or has received.

The image former 42 performs image formation based on the image data which the machine 10 is requested to copy or has received.

The timer 44 measures stand-by time.

Figure 2:
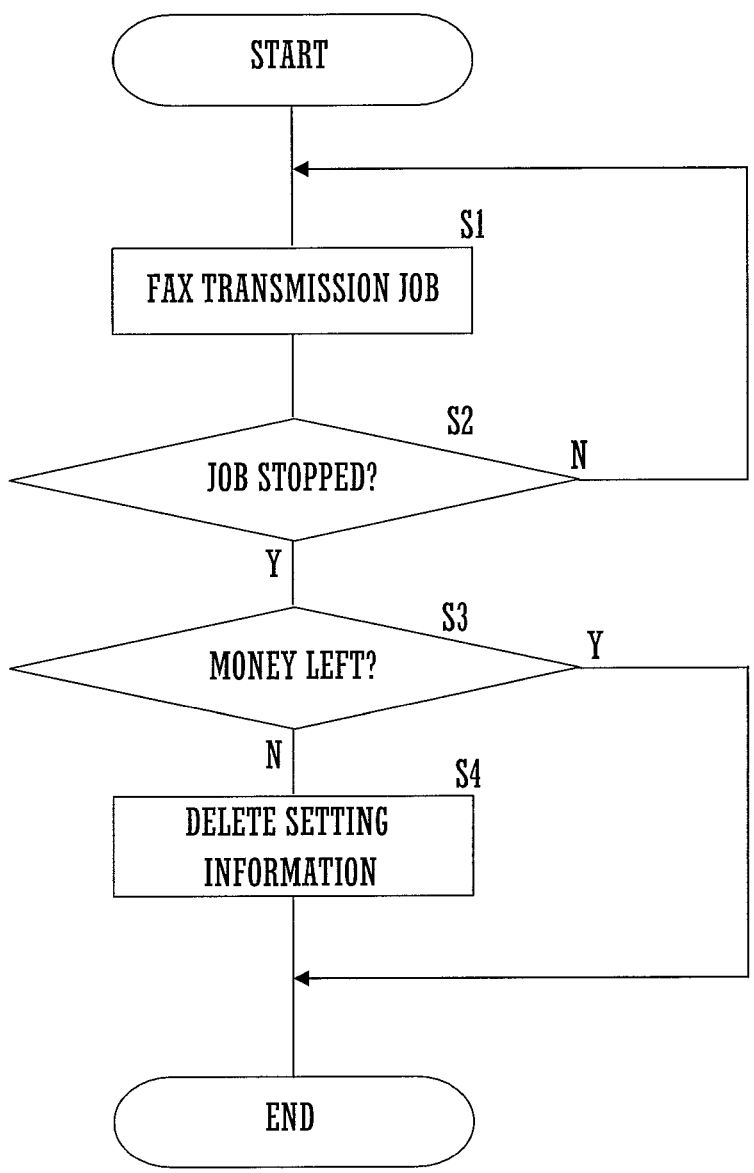
FIG. 2 is a flowchart of a procedure according to which the controller of the fax machine can operate.

FIG. 2 shows a procedure according to which the controller 22 can operate during fax transmission.

With reference to FIG. 2, the machine 10 starts a fax transmission job (S1) if a user inserts into the money inlet 17 an amount of money equal to or larger than the charge for one sheet and enters setting information on the job through the console 38.

Subsequently, the controller 22 determines at step S2 whether the transmission job has stopped. A fax transmission job stops when the machine 10 has faxed a set number of sheets. A fax transmission job is interrupted if it requests the machine 10 to fax more sheets than the limit number of sheets which the machine can fax serially at a time. A fax transmission job is also interrupted if no sheet of paper is held in the machine 10, or if a paper jam occurs in it.

If the controller 22 determines at step S2 that the transmission job has stopped, the controller determines at step S3 whether the machine 10 can further fax one or more sheets for this job. The determination at step S3 makes it possible to determine whether the transmission job is completed.

If the controller 22 determines at step S3 that no more sheet can be faxed, the controller clears the setting recorder 28 at step S4.

If the controller 22 determines at step S3 that one or more sheets can be faxed further, the setting information is kept in the setting recorder 28, so that the user does not need to reenter the information when he/she redials.

According to the procedure shown in FIG. 2, the controller 22 determines, based on the number of sheets which can be faxed further for a fax transmission job, whether the job is completed. The controller 22 can, in place of, or in addition to this procedure, determine, based on the presence or absence of a credit card in the card inlet 16, whether a fax transmission job is completed.

Figure 3:
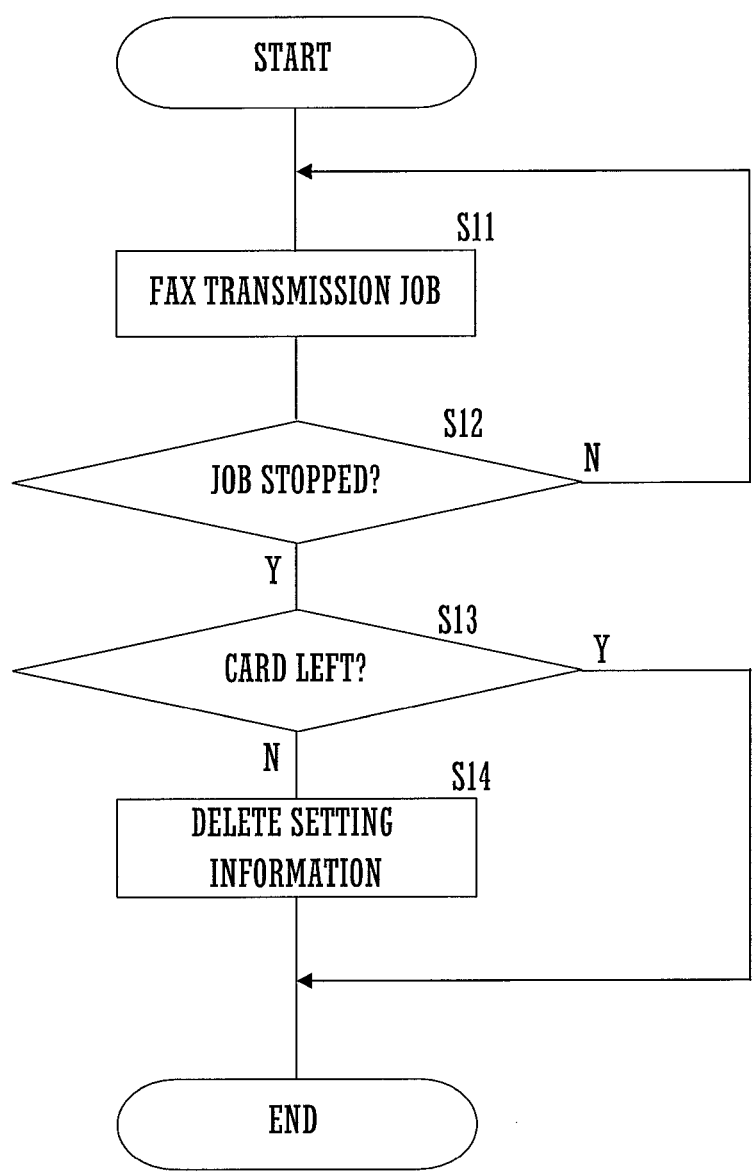
FIG. 3 is a flowchart of another procedure according to which the controller can operate.

FIG. 3 shows another procedure according to which the controller 22 can operate during fax transmission. According to this procedure, if there is a credit card in the card inlet 16, the controller 22 determines that the machine 10 can fax an infinite number of sheets for a fax transmission job.

If the card inlet 16 were designed to receive a prepaid card, the controller 22 would calculate, based on the data recorded on the prepaid card inserted into the inlet 16 and the charge for one sheet, how many sheets the machine 10 could further fax for a fax transmission job.

According to the procedure of FIG. 3, when a fax transmission job stops, the controller 22 determine, based on the presence or absence of a credit card in the card inlet 16, whether the job is completed.

With reference to FIG. 3, the machine 10 starts a fax transmission job (S11) if a user inserts a credit card into the card inlet 16 and enters setting information on the job through the console 38.

Subsequently, the controller 22 determines at step S12 whether the transmission job has stopped.

If the controller 22 determines at step S12 that the transmission job has stopped, the controller determines at step S13 whether the credit card is present in the card inlet 16. The determination at step S13 makes it possible to determine whether the transmission job is completed.

If the controller 22 determines at step S13 that there is no credit card in the card inlet 16, the controller clears the setting recorder 28 at step S14.

If the controller 22 determines at step S13 that the credit card is present in the card inlet 16, the setting information is kept in the setting recorder 28, so that the user does not need to reenter the information when he/she redials.

Figure 4:
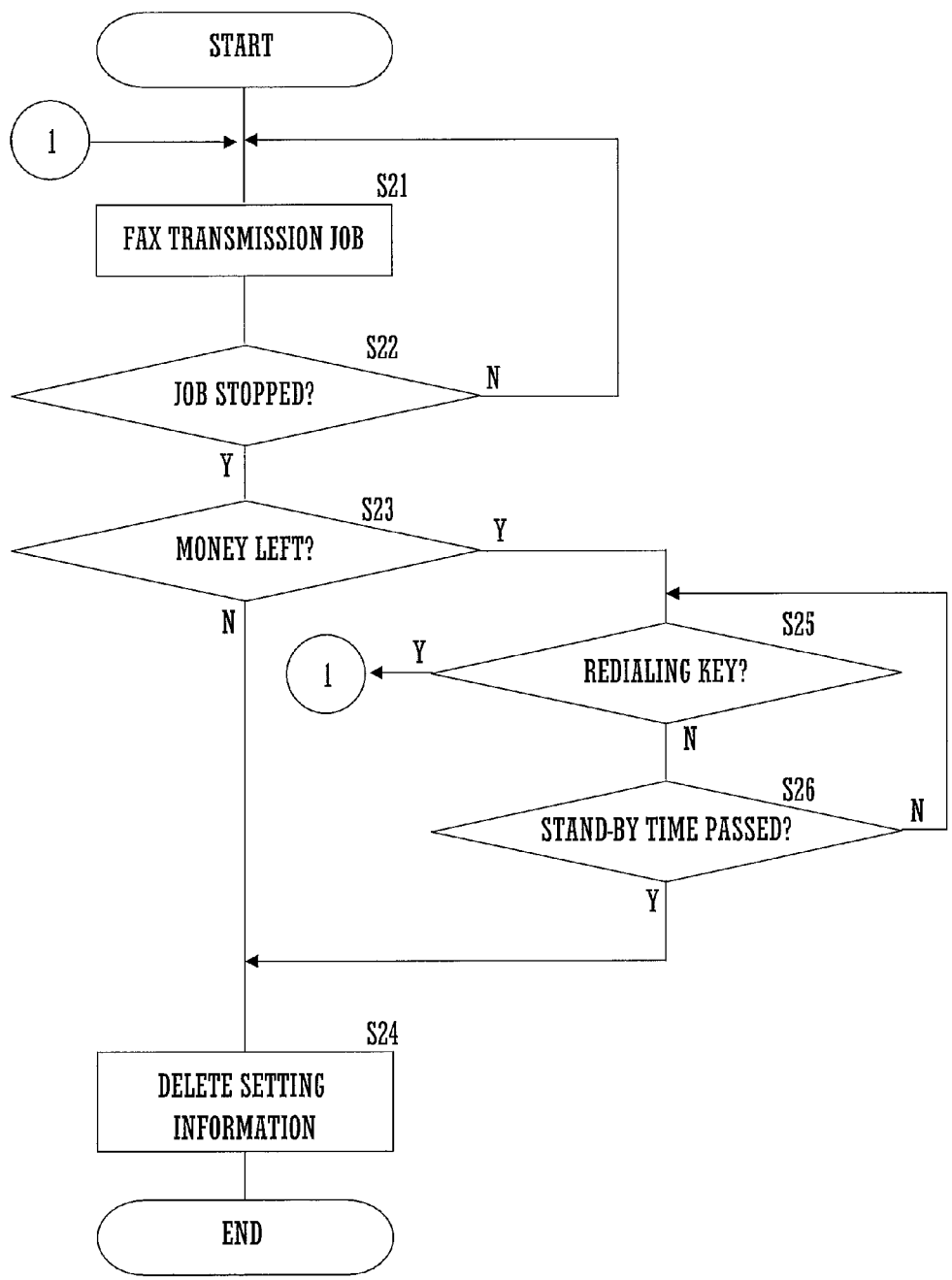
FIG. 4 is a flowchart of another procedure according to which the controller can operate.

FIG. 4 shows another procedure according to which the controller 22 can operate during fax transmission.

With reference to FIG. 4, as is the case with the procedure shown in FIG. 2, the machine 10 starts a fax transmission job (S21) if a user inserts into the money inlet 17 an amount of money equal to or larger than the charge for one sheet and enters setting information on the job through the console 38.

Subsequently, the controller 22 determines at step S22 whether the transmission job has stopped.

If the controller 22 determines at step S22 that the transmission job has stopped, the controller determines at step S23 whether the machine 10 can further fax one or more sheets for this job. The determination at step S23 makes it possible to determine whether the transmission job is completed.

If the controller 22 determines at step S23 that no more sheet can be faxed, the controller clears the setting recorder 28 at step S24.

If the controller 22 determines at step S23 that one or more sheets can be faxed further, the controller determines at steps 25 and 26 whether the redialing key 382 has been pressed within a specified stand-by time. Specifically, the controller 22 determines at step 25 whether the redialing key 382 has been pressed.

If the controller 22 determines at step 25 that the redialing key 382 has been pressed, the machine 10 restarts the transmission job (S21), with the setting information kept.

If the stand-by time has passed without the redialing key 382 pressed (S26), the controller 22 clears the setting recorder 28 at step S24. It is preferable that the stand-by time should vary with the number of sheets which can be faxed further for the transmission job.

FIG. 5 shows the relation between the number of sheets and the stand-by time. If the number of sheets is 5 or smaller, the stand-by time is set at 3 minutes. The stand-by time increases with the number of sheets. If the number of sheets is 50 or larger, the stand-by time is set at 30 minutes.

If the number of sheets is smaller, it is more possible that the user will forget to take the remainder of the inserted money from the money outlet 18 after using the machine 10. In this case, the stand-by time is set shorter so that the setting information is deleted sooner. As a result, even if the user forgets to take out the remainder of the inserted money, the risk of information leakage is lower.

If the number of sheets is larger, it is less possible that the user will forget to take out the remainder of the inserted money. In this case, the stand-by time is set longer. As a result, it is less possible that the setting information will be deleted before the user stops using the machine 10.

If the procedure shown in FIG. 4 were so programmed that the machine 10 would start the transmission job when a credit card is inserted into the card inlet 16, the stand-by time would be set at 30 minutes.

FIG. 6 shows another procedure according to which the controller 22 can operate during fax transmission.

With reference to FIG. 6, the machine 10 starts a fax transmission job (S31) if a user inserts into the money inlet 17 an amount of money equal to or larger than the charge for one sheet and enters setting information on the job through the console 38.

Subsequently, the controller 22 determines at step S32 whether the transmission job has stopped.

If the controller 22 determines at step S32 that the transmission job has stopped, the controller determines at step S33 whether the machine 10 can further fax one or more sheets for this job.

If the controller 22 determines at step S33 that the machine 10 can further fax one or more sheets, the setting information is kept in the setting recorder 28, so that the user does not need to reenter the information when he/she redials.

If the controller 22 determines at step S33 that no more sheet can be faxed, the controller 22 determines at steps S34 and S35 whether money has been inserted into the money inlet 17 within a specified stand-by time. Specifically, the controller 22 determines at step S34 whether money has been inserted into the money inlet 17.

If the controller 22 determines at step S34 that money has been inserted, the procedure returns to step S33.

If the controller 22 determines at step S34 that no money has been inserted within this stand-by time, the controller clears the setting recorder 28 at step S36.

As a result, even when no more sheets can be faxed for the transmission job, the job can, if money is inserted soon, be restarted without the setting information reentered.

As stated already, the determination device 34 determines whether a fax transmission job is completed. Alternatively, a user could stop a fax transmission job by pressing the stop key 122. In this case, the setting recorder 28 would be cleared when the user presses the stop key 122.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A fax machine having an accounting function, the machine comprising:
   a setting recorder for holding setting information on a fax transmission job which a user requests the fax machine to perform;
   a job processor for performing the transmission job based on the held setting information;
   a money inlet for receiving money;
   a remainder calculator for calculating a remainder by subtracting, from the amount of money inserted into the money inlet for the transmission job, the charge of the fax machine for the sheets faxed already for the job, the remainder calculator being adapted to also calculate, based on the remainder of the inserted amount and the charge of the fax machine for one sheet, the number of sheets which can be faxed further for the transmission job by the machine;
   determination device for determining, based on the calculated number of sheets which can be faxed further for the transmission job reaching zero, whether the transmission job is completed, when the job stops; and
   a recording controller for clearing the setting recorder if the determination device determines, when the transmission job stops, that the job is completed;
   the recording controller being adapted not to clear the setting recorder if the determination device determines, when the transmission job stops, that the job is not completed.

2. A fax machine as claimed in claim 1, wherein, based on the number of sheets calculated by the remainder calculator and the stand-by time having passed after the transmission job stops, the determination device determines whether the job is completed.

3. A fax machine as claimed in claim 1, wherein the setting information includes a destination number.

4. A fax machine as claimed in claim 1, further comprising a stop key adapted to be pressed by the user so as to stop the transmission job;

wherein the recording controller clears the setting recorder when the stop key is pressed.

5. A fax machine as claimed in claim 1, further comprising a redialing key adapted to be pressed by the user so as to redial;

wherein, when the redialing key is pressed, the job processor performs the transmission job based on the setting information held in the setting recorder.

6. A fax machine having an accounting function, the machine comprising:

a setting recorder for holding setting information on a fax transmission job which a user requests the fax machine to perform;

a job processor for performing the transmission job based on the held setting information;

a card inlet for receiving a card for accounting, the card holding personal information on the user;

a remainder calculator for calculating, based on the held personal information and the charge of the fax machine for one sheet, the number of sheets which can be faxed further for the transmission job by the machine;

a determination device for determining, based on the presence or absence of the card in the card inlet, whether the transmission job is completed, when the job stops; and a recording controller for clearing the setting recorder if the determination device determines, when the transmission job stops, that the job is completed, the recording controller being adapted not to clear the setting recorder if the determination device determines, when the transmission job stops, that the job is not completed.

7. A fax machine as claimed in claim 6, wherein the setting information includes a destination number.

8. A fax machine as claimed in claim 6, further comprising a stop key adapted to be pressed by the user so as to stop the transmission job;

wherein the recording controller clears the setting recorder when the stop key is pressed.

9. A fax machine as claimed in claim 6, further comprising a redialing key adapted to be pressed by the user so as to redial;

wherein, when the redialing key is pressed, the job processor performs the transmission job based on the setting information held in the setting recorder.

\* \* \* \* \*